United States Patent [19]
Cooke

[11] Patent Number: 5,870,976
[45] Date of Patent: Feb. 16, 1999

[54] BOILER WITH SERPENTINE TUBES

[76] Inventor: George Cooke, 2A Palace Street East, Berwick Upon Tweed TD15 1HT, England

[21] Appl. No.: 915,713

[22] Filed: Aug. 21, 1997

[30] Foreign Application Priority Data

Aug. 26, 1996 [CA] Canada .................................. 2184138

[51] Int. Cl.[6] .................................................. F22B 21/04
[52] U.S. Cl. ................ 122/347; 122/235.15; 122/235.23
[58] Field of Search ................................. 122/138, 166.1, 122/166.2, 172, 235.15, 235.23, 235.31, 347

[56] References Cited

U.S. PATENT DOCUMENTS 4,612,879  9/1986  Cooke .................................. 122/235 F
5,050,542  9/1991  Cooke .................................. 122/235.23

Primary Examiner—John A. Jeffery
Assistant Examiner—Gregory A. Wilson
Attorney, Agent, or Firm—Ridout & Maybee

[57] ABSTRACT

A highly efficient boiler made up of a housing containing upper and lower manifolds. Identical tubes connect the manifolds on the right and left sides to form a plurality of superimposed passages which the combustion gases must successively traverse laterally front to back and upwardly back to front.

8 Claims, 12 Drawing Sheets

BOILER WITH SERPENTINE TUBES

FIELD OF THE INVENTION

The present invention relates to a novel construction of a boiler, or similar heat exchanger, for heating water while cooling hot gases which are the products of combustion.

BACKGROUND OF THE INVENTION

Numerous designs exist in connection with this type of boiler: see, for example, Canadian Patent No. 1,182,698 to Cooke as well as 2,032,711 also to Cooke. However, these constructions, which mainly consist of upper and lower manifolds between which a plurality of serpentine liquid carrying tubes are mounted, do not permit the hot gases to pass laterally from passage to passage, the gases only rise.

OBJECTS AND STATEMENT OF THE INVENTION

It is an object of the present invention to provide a boiler which is simple to construct, to assemble and to operate, which is highly efficient and capable of handling varying loads, and which is suitable for use on a large scale, as in large buildings, industrial electric and co-generation plants as well as in relatively small residential installations.

These objects are achieved by providing a boiler in accordance with the present invention which comprises a housing having a top provided with a gas outlet, which can be positioned either at the front or the rear of the housing to suit individual site conditions, a bottom, left and right sides, and a front and back. Within the housing, an upper manifold and lower manifold extend substantially parallel to the top, bottom and side walls; between these two manifolds, two sets of tubes are displayed. Each set of tubes are identical the tubes being bent serpentinely so as to form a plurality of superimposed gas passages; at least two tubes of each set are bent differently so as to form access openings to the passages above below and adjacent.

The bends of the serpentine tubes are substantially in contact so they close the lowermost chamber and the gas passages within the housing. The gas passages are closed on the sides by removable closing plates. One set of tubes joins the upper left side of the upper manifold to the lower left side of the lower manifold while the other set of tubes joins the upper right side of the upper manifold to the lower right side of the lower manifold. The openings from passage to passage are offset so as to require a gas flowing through said passages to traverse one passage from front to back and the next passage from back to front. Means are provided for introducing liquid into the lower manifold and for withdrawing the liquid from the upper manifold; means are also provided for introducing a combustion gas into the lowermost of the superimposed passages. The combustion gases rise successively through the passages which they successively and alternately traverse from front to back and, then, from back to front, until they exit from the uppermost chamber through the gas outlet at the top, liquid flowing through the manifolds and tubes being heated by the combustion gases.

Advantageously, the tubes of each set are in substantial contact with one another so as to substantially prevent passage of combustion gas therebetween. In a preferred embodiment, there is provided a damper at the front of the passage above the lowermost passage so the furnace pressure can be controlled in conjunction with the amount of products of combustion being produced.

It is an object of the present invention to provide a boiler built with identical serpentine tubes on each side and a passage separator to increase the path of the hot gases to optimize heat exchange.

The boiler can be constructed lower in height and is less expensive to manufacture than the prior art.

In one form of the boiler, the gases in the gas passages above the furnace, or lowermost chamber, flow from above the rear to the front of the boiler and exit at the front.

The simple addition of an insulating board along the top of the uppermost tubes where the tubes connect to the upper manifold will redirect the gases to either the front or the rear of the boiler to exit to the atmosphere through the gas outlet.

To provide for expansion and contraction of the metal of the serpentine tubes, the boiler may be brought from a cold condition to full operating temperature in about ten minutes. The boiler can operate with a temperature differential of 150 degrees Fahrenheit between the inlet and outlet. Also, the boiler can be cooled rapidly for examination and or repairs without sustaining any permanent structural damage.

The boiler can be easily field assembled without welding in existing buildings through existing doorways, thus eliminating costly general contract work.

The boiler meets all of the requirements of the American Society of Mechanical Engineers boiler and pressure vessels, sections I and IV, which are recognized by agencies of most governments. The novel boiler incorporates the best features of the fire boiler by controlling the passage of hot gases and, by confining the water within small tubes, takes advantage of the best features of the water tube boiler.

All internal parts and surfaces are easily accessible for service and cleaning so the unit is suitable for burning light oil, residual oils, crude oils, waste oils, and type of gas, and any type of coal or solid fuel, including municipal waste.

Other objects and further scope of applicability of the present invention will become apparent from the detailed description given hereinafter. It should be understood, however, that this detailed description while indicating preferred embodiments of the invention, is given by way of illustration only, since various changes and modifications within the spirit and scope of the invention will become apparent to those skilled in the art.

BRIEF DESCRIPTION OF THE DRAWINGS

The invention will be further described with reference to the accompanying drawings, wherein.

DESCRIPTION OF PREFERRED EMBODIMENTS

Figure 1:
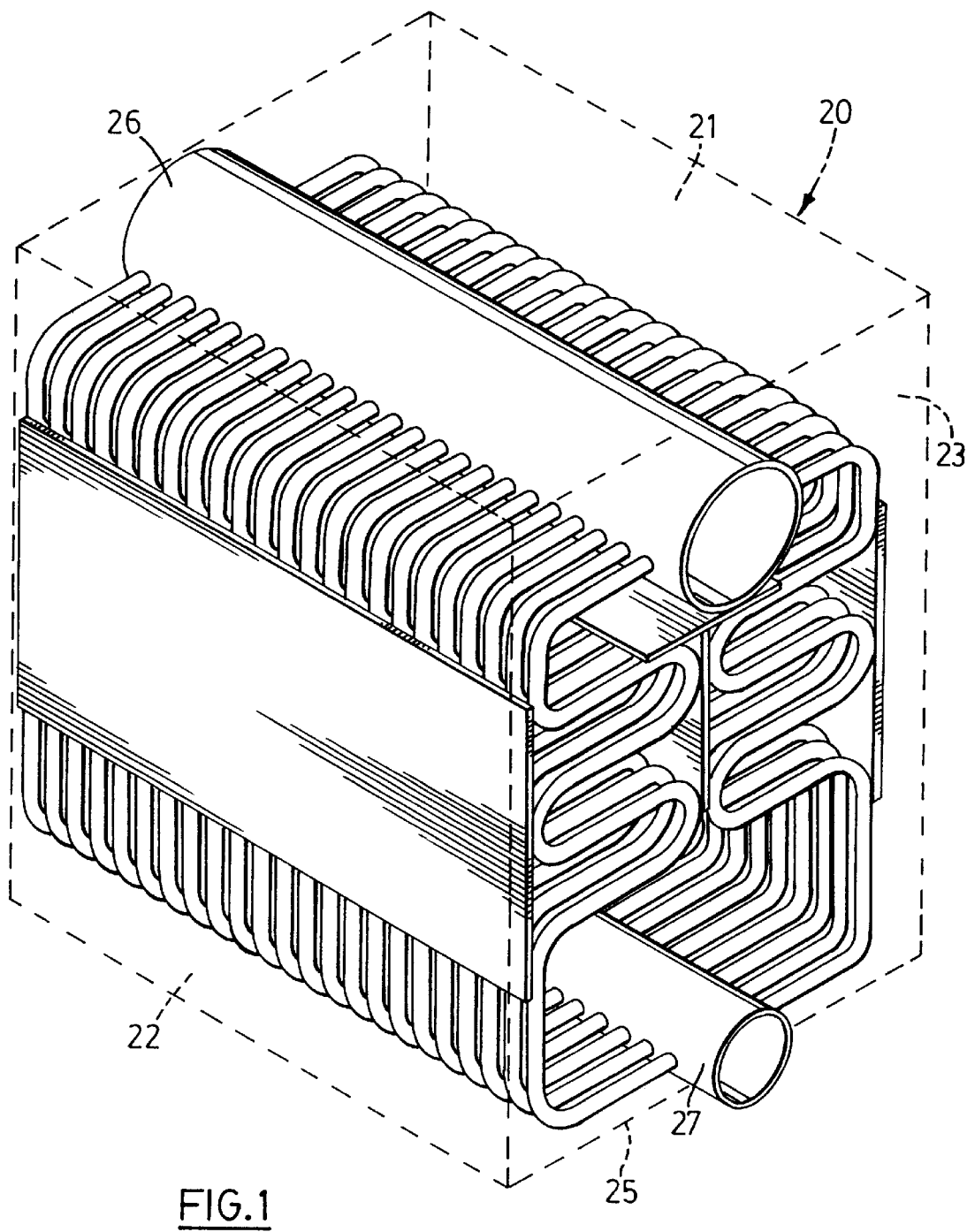
FIG. 1 is a perspective view of a boiler of the invention with the housing shown in phantom. The differently bent tubes that form the access opening are not shown for clarity.
Figure 2:
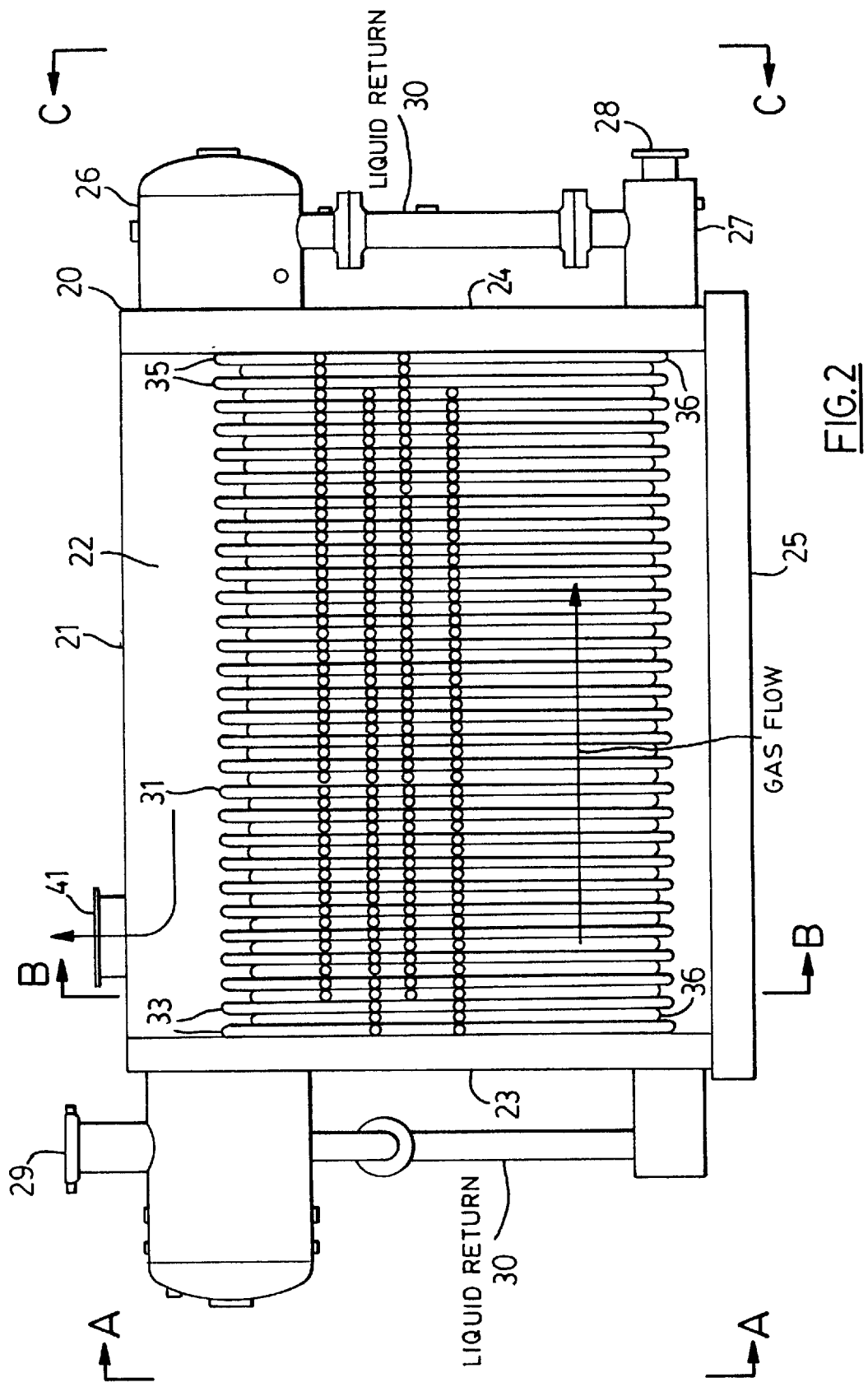
FIG. 2 is a right side view of the boiler and housing and the gas exit at the front of the boiler.

Referring more particularly to FIGS. 1 and 2, there is shown a housing 20 having a top wall 21, opposite side walls 22, a front wall 23, a rear wall 24, a base 25, and a gas outlet 41 at the front. There are also provided an upper manifold 26, a lower manifold 27, a connection 28 for introducing liquid into the lower manifold, a connection 29 for withdrawing heated liquid or steam from the upper manifold, liquid return connection 30 at the bottom of the upper manifold to the top of the lower manifold: serpentine tubes 32 which form the gas passages, serpentine tubes 33 which form the access openings from gas passage to gas passage at the front, and serpentine tubes 36 which form the access openings from gas passage at the rear gas outlet 41 is shown.

Figure 3:
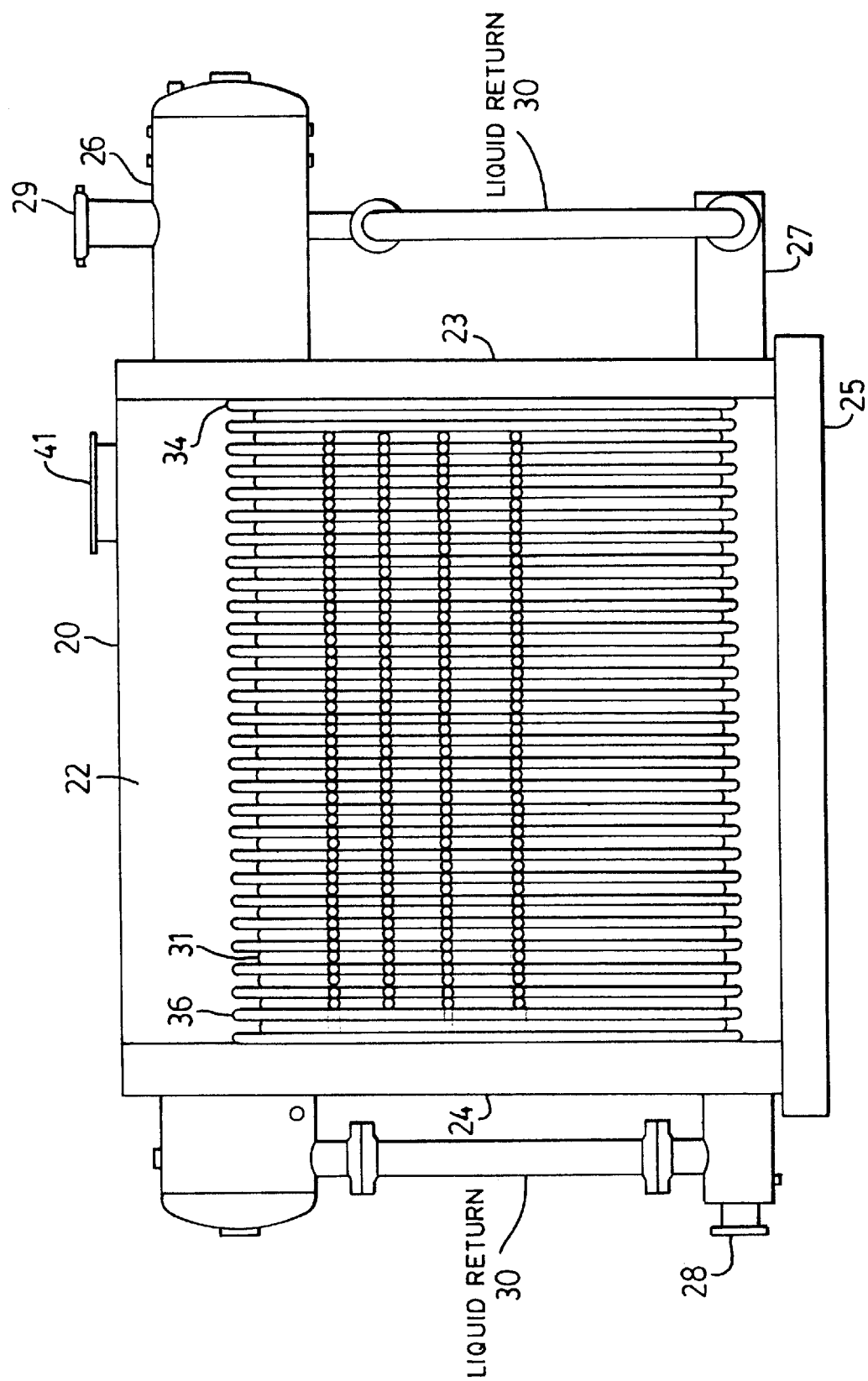
FIG. 3 is a left side view of the boiler in all configurations.

FIG. 3 there is shown a housing 20 having a top wall 21, opposite side walls 22, a front wall 23, a rear wall 24, a base 25, and a gas outlet 41 at the front. There are also provided an upper manifold 26, a lower manifold 27, a connection 28 for introducing liquid into the lower manifold, a connection 29 for withdrawing heated liquid or steam from the upper manifold, liquid return connection 30 at the bottom of the upper manifold to the top of the lower manifold: serpentine tubes 31 which form the gas passages, tubes 34 which form the access openings from gas passage to gas passage at the front and serpentine tubes 36 which form the access openings from gas passage at the rear outlet 41 as shown.

Figure 4:
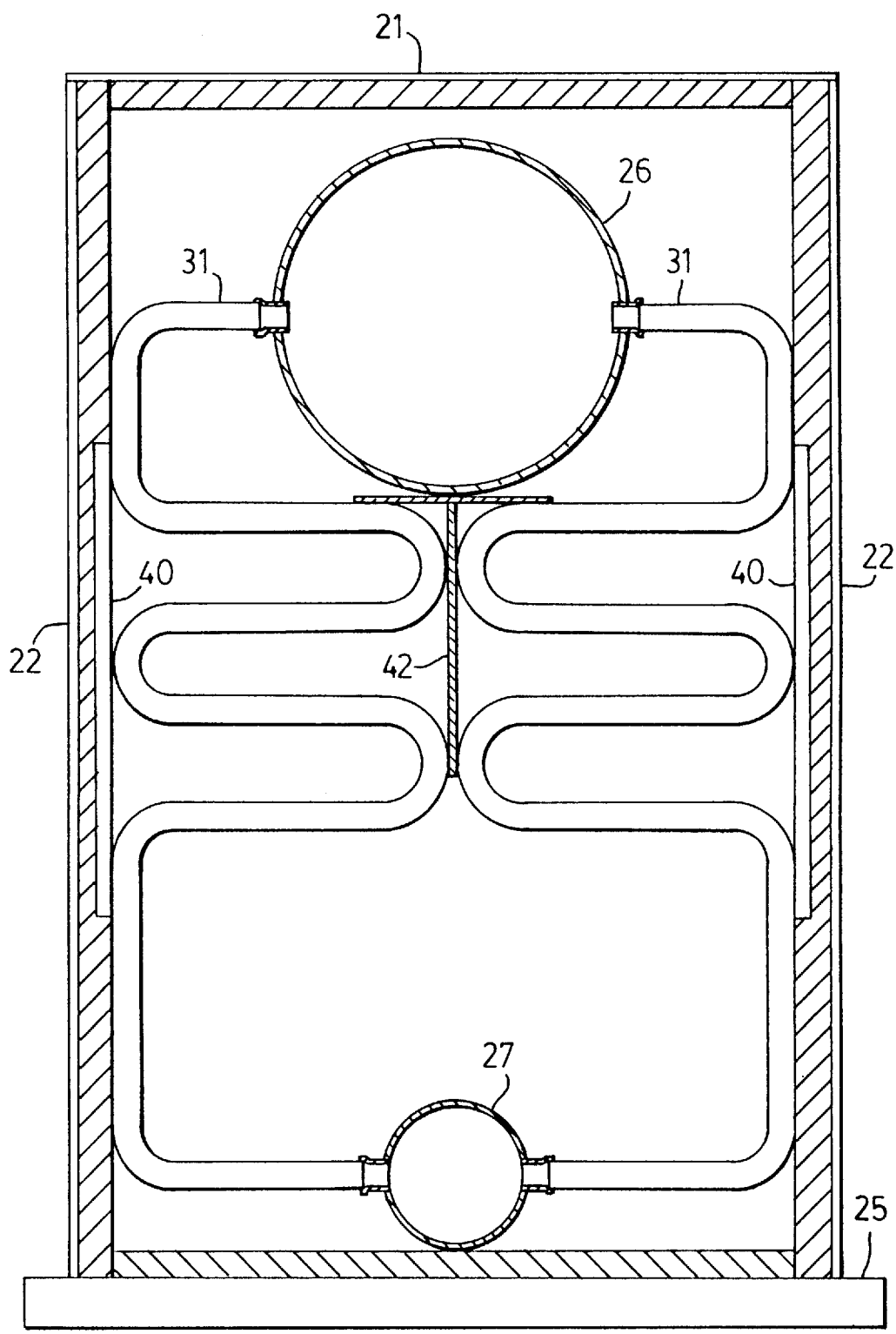
FIG. 4 is section at B—B of FIG. 2 and FIG. 11 showing the serpentine and straight tubes and the manifolds.
Figure 11:
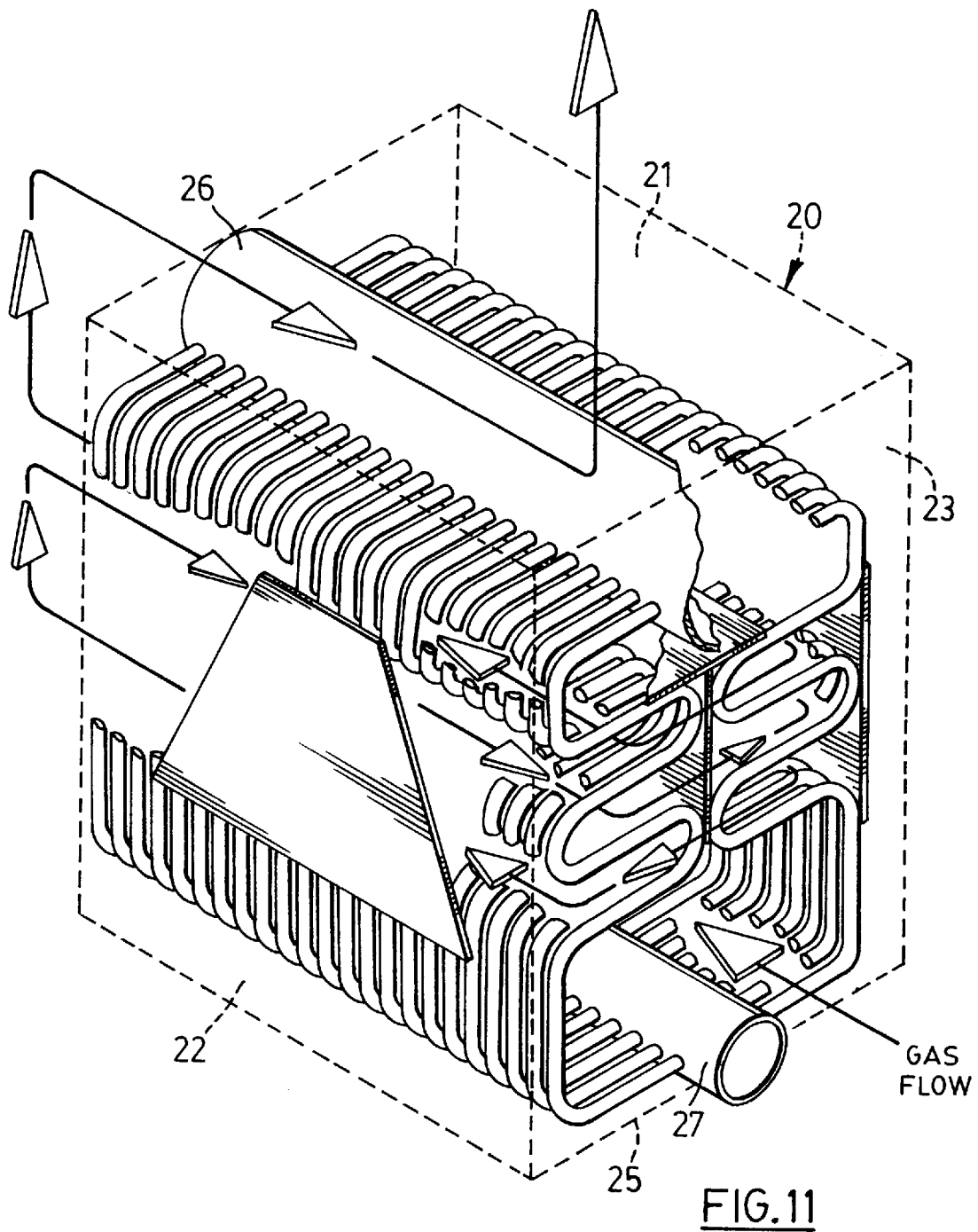
FIG. 11 is a perspective view of a boiler showing the path of the hot gases.
Figure 12:
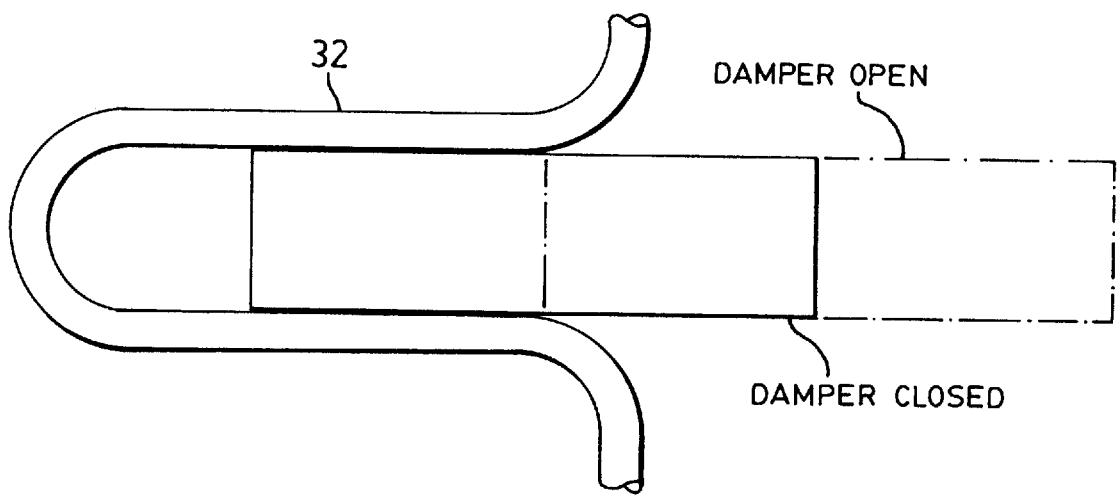
FIG. 12 is a detail of the furnace control damper.

FIG. 4 is a section common to all boilers of FIG. 2 and 11 and shows top wall 21, side walls 22 and base 25. It shows the formation of gas passages with serpentine tubes 31 and passage isolator 42.

Figure 5:
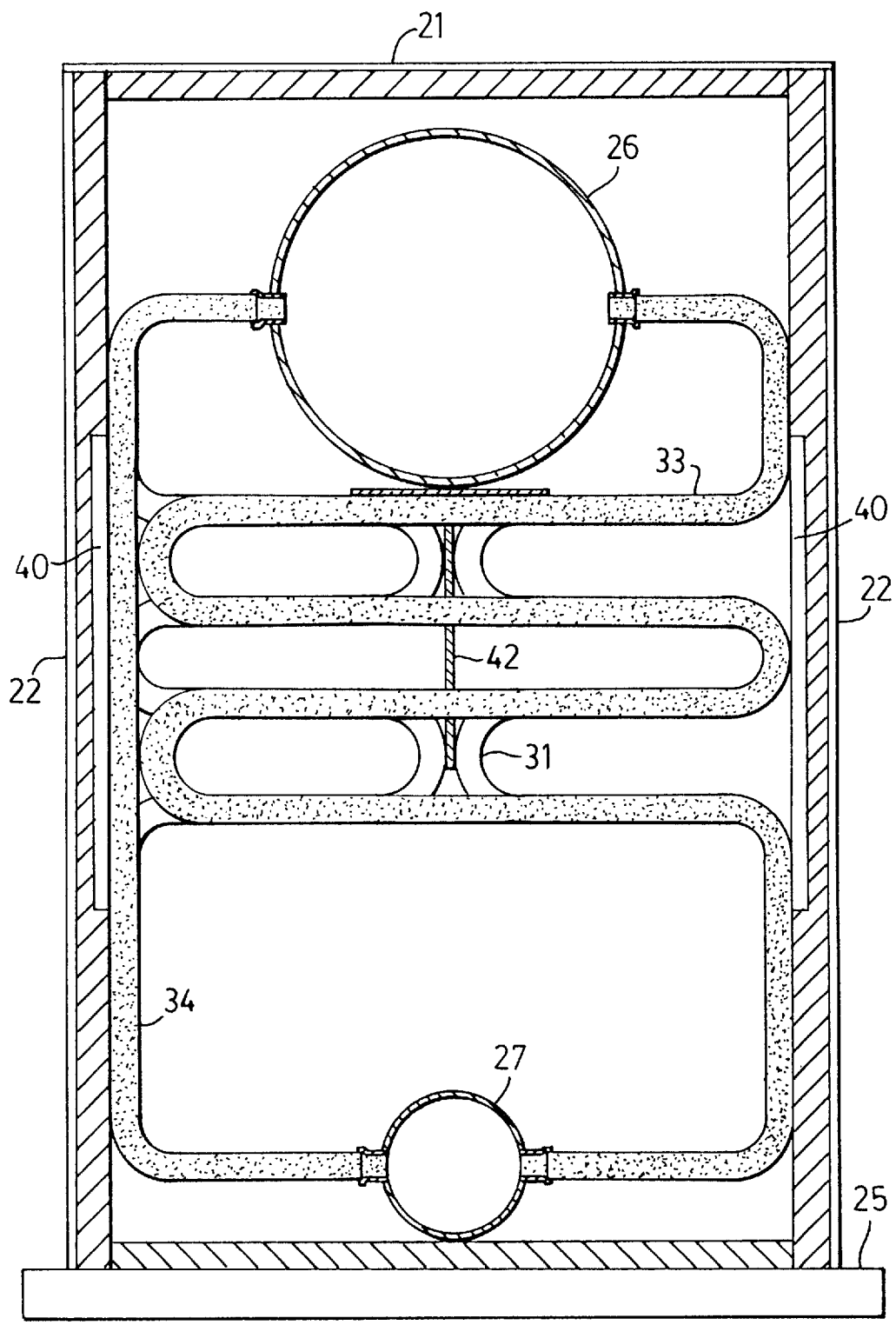
FIG. 5 is a front view of FIG. 2 showing the differently bent tubes that form the access opening to permit the gases to flow from one gas passage to next.

FIG. 5 is a front view of FIG. 2 showing top wall 21, side walls 22, and base 25. It shows the serpentine tubes that are bent differently to form the access openings that allow the gases to flow from one gas passage to the next, 33 and 34, the serpentine tubes 31 are shown, upper manifold 26, lower 27, connection for withdrawing liquid or steam from the upper manifold 29 removable gas passage closing plate 40 and passage isolator 42.

Figure 6:
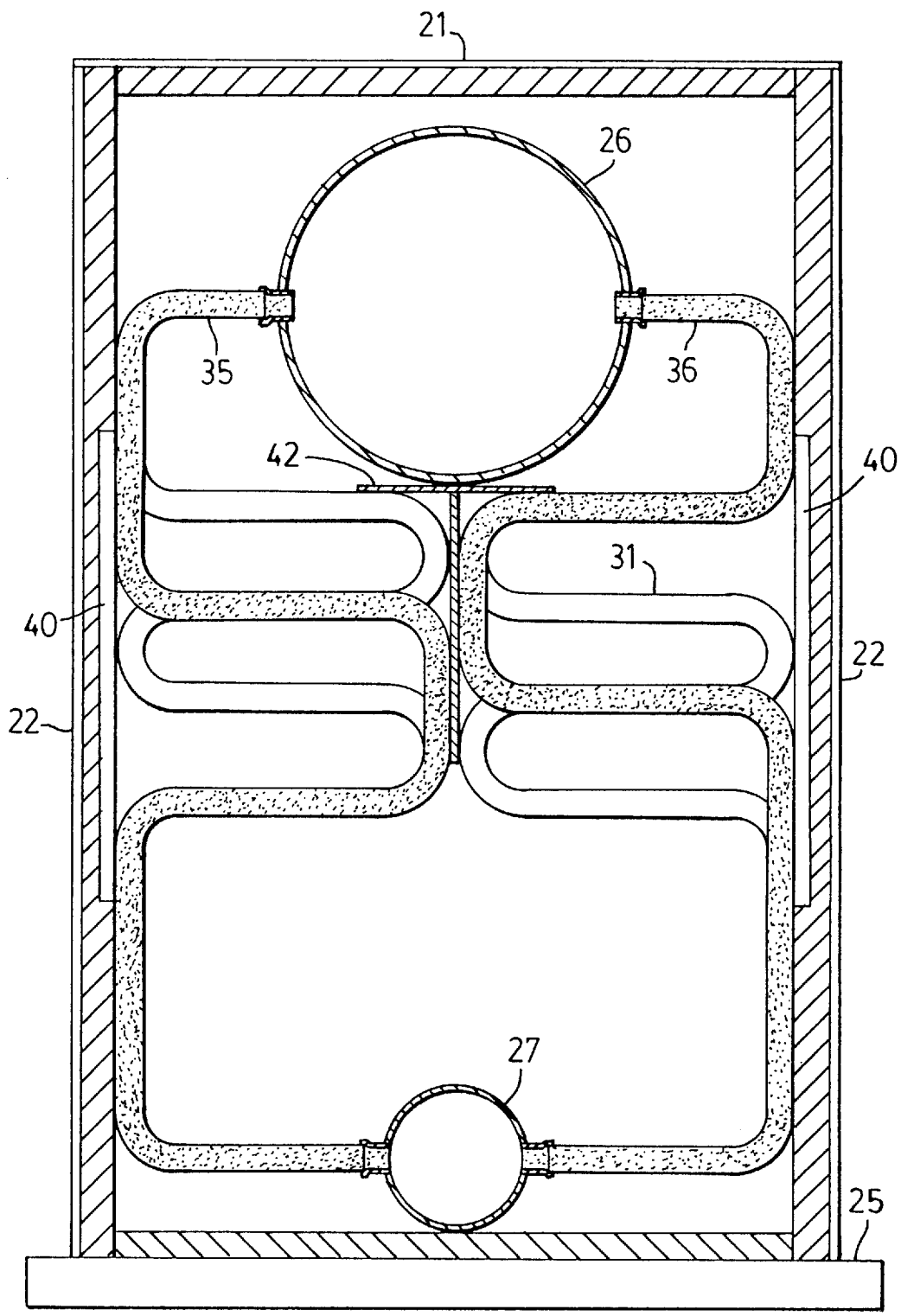
FIG. 6 is a rear view of FIG. 3 showing the differently bent tubes that form the access opening to permit the gases to flow from one gas passage to the next.

FIG. 6 is a rear view of FIG. 2 showing top wall 21, side walls 22, and base 25. It shows the serpentine tubes that are bent differently to form the access openings that allow the gases to flow from one gas passage to the next, 35 and 36, serpentine tubes 31 are shown, upper manifold 26, lower manifold 27, removable gas passage closing plate 40 and passage isolator 42.

Figure 7:
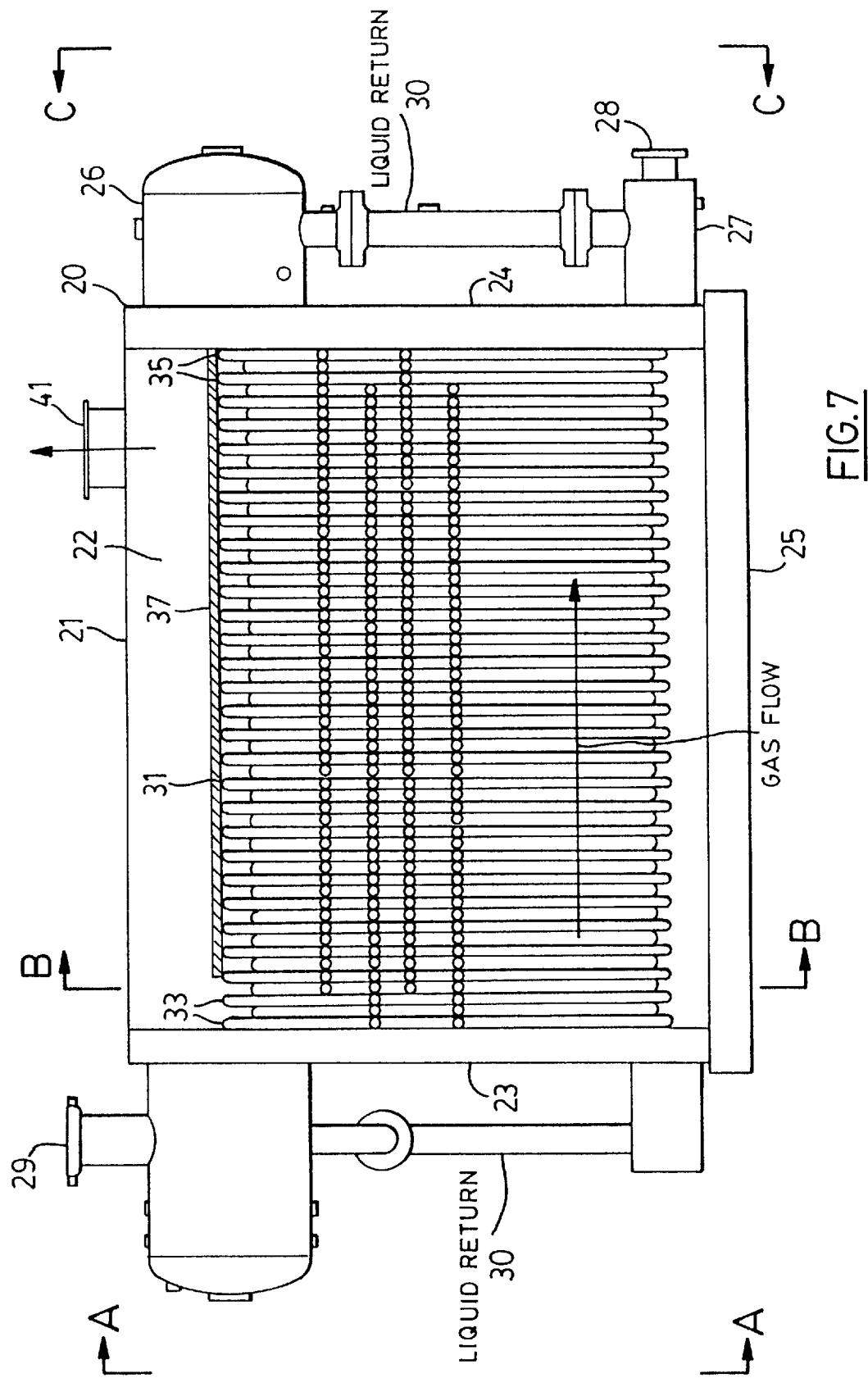
FIG. 7 is a right side view of the boiler and housing with a single gas pass through the furnace or lowermost passage, with an insulating board redirecting the gas to exit at the rear of the boiler.

FIG. 7 shows a housing 20 having a top wall 21, two side walls 22, a front wall 23, a rear wall 24, a base 25 and a gas outlet 41 at the front. An upper manifold 26, a lower manifold 27, a connection 28 for introducing liquid into the lower manifold, a connection 29 for withdrawing heated liquid or steam from the upper manifold, liquid return connection 30 at the bottom of the upper manifold to the top of the lower manifold.

Serpentine tubes 31 which form the gas passages, and serpentine tubes 34 which form the access openings from gas passage to gas passage at the front and serpentine tubes 36 which form the access openings from gas passage to gas passage at the rear, and an insulating board 37 that redirects the gases to the front of the boiler.

Figure 8:
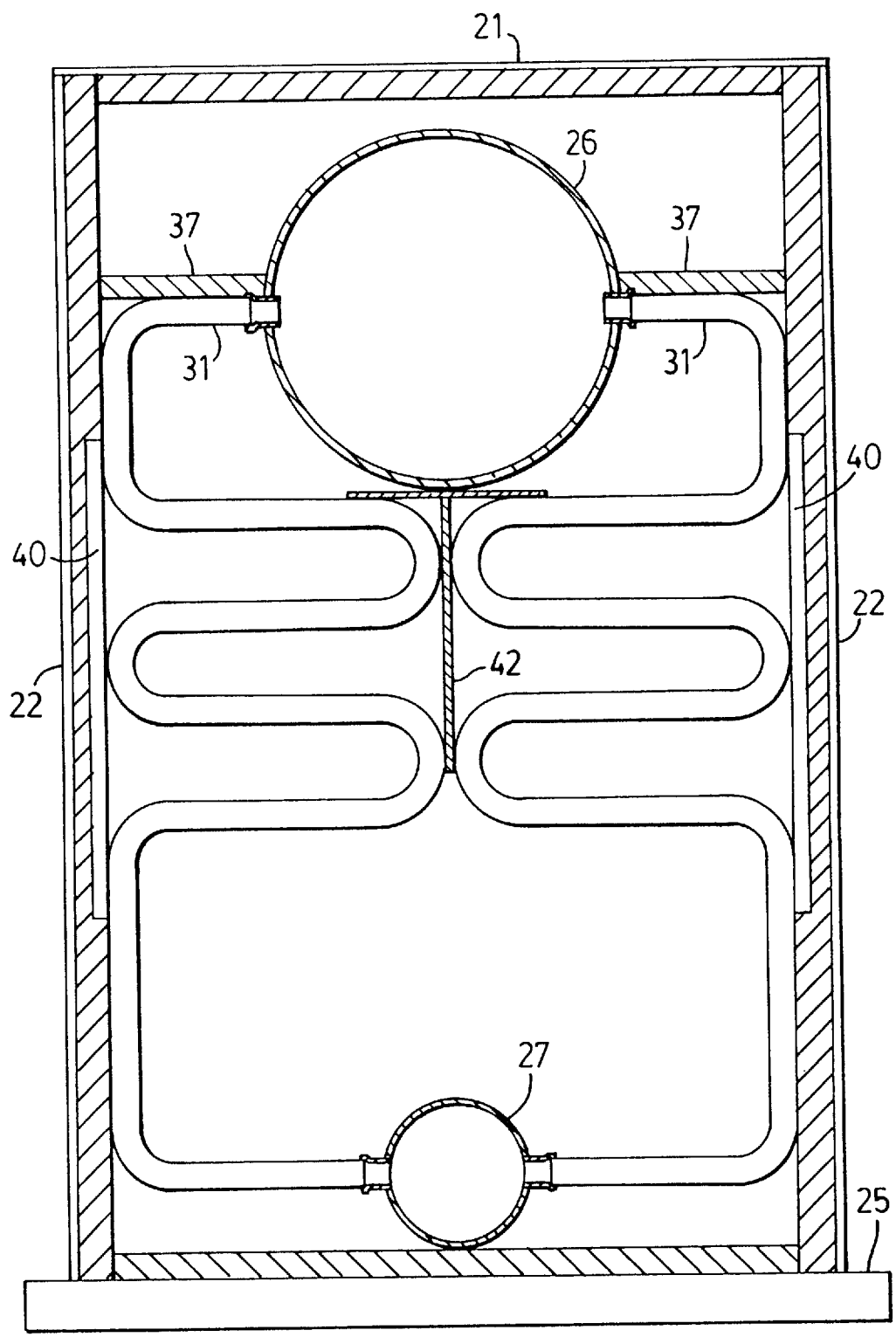
FIG. 8 is a section at B—B of FIG. 7 and FIG. 14 showing the serpentine and straight tubes, the manifolds and the insulating board which redirects the gases.

FIG. 8 is a section common to the boilers of FIG. 7 with top wall 21, side walls 22 and base 25. It shows the formation of gas passages with serpentine tubes 31 and the gas passage closing plate 40. It shows the upper manifold 26 and the lower manifold 27, the insulating board 37 that redirects the gases, and gas passage isolator 42.

Figure 9:
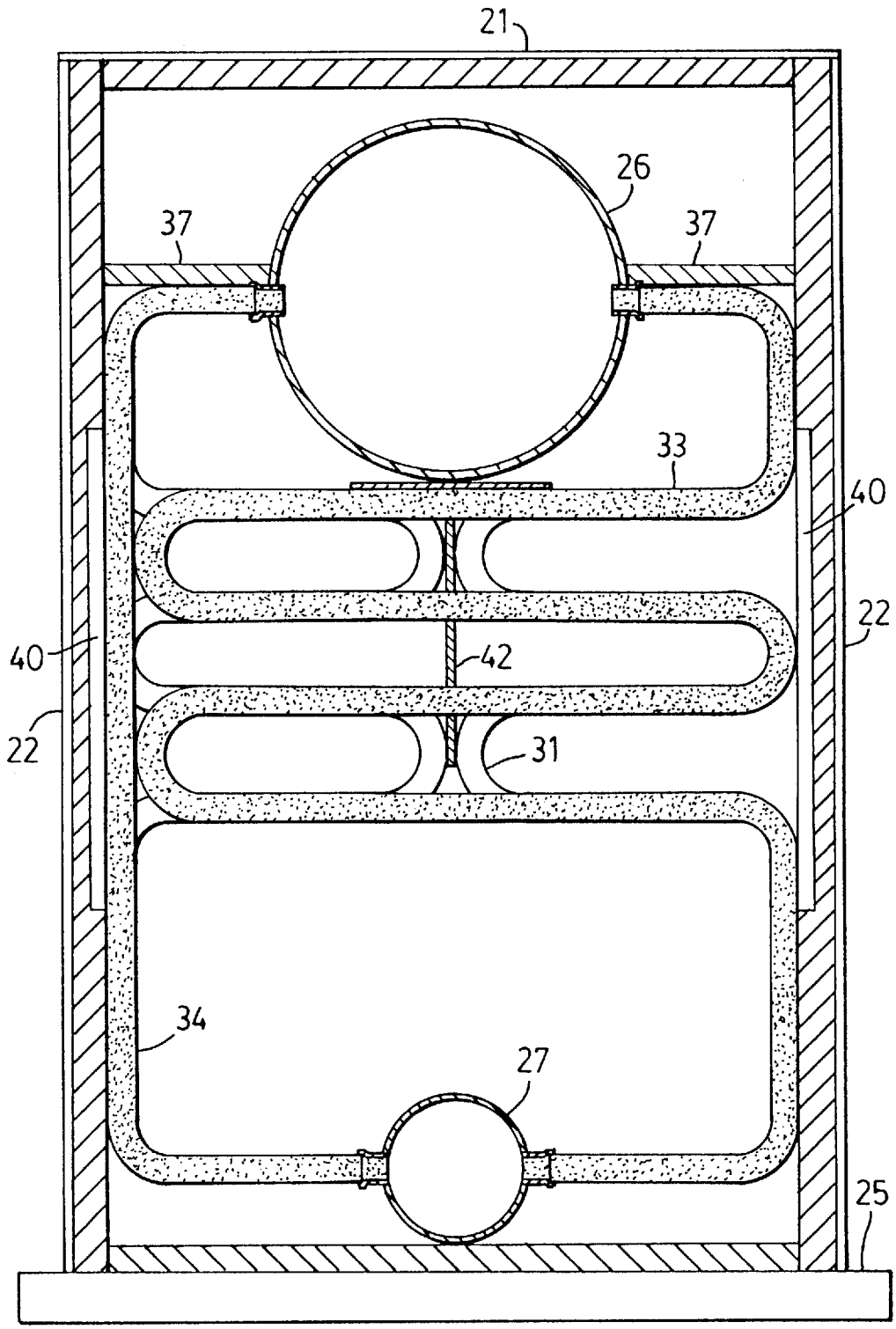
FIG. 9 is a front view of FIG. 7 showing the differently bent tubes that form the access opening to permit the gases to flow from one gas passage to the next with the insulating board which redirects the gases.

FIG. 9 is a front view of FIG. 7 showing top wall 21, side walls 22, and base 25. It shows the serpentine tubes that are bent differently to form the access openings that allow the gases to flow from one gas passage to the next, 33 and 341 the serpentine tubes 31 are shown upper manifold 26, lower manifold 27, connection 29 for withdrawing liquid or steam from the upper manifold, removable gas passage closing plate 40, and the insulating board 37 that redirects the gases and gas passage isolator 42.

Figure 10:
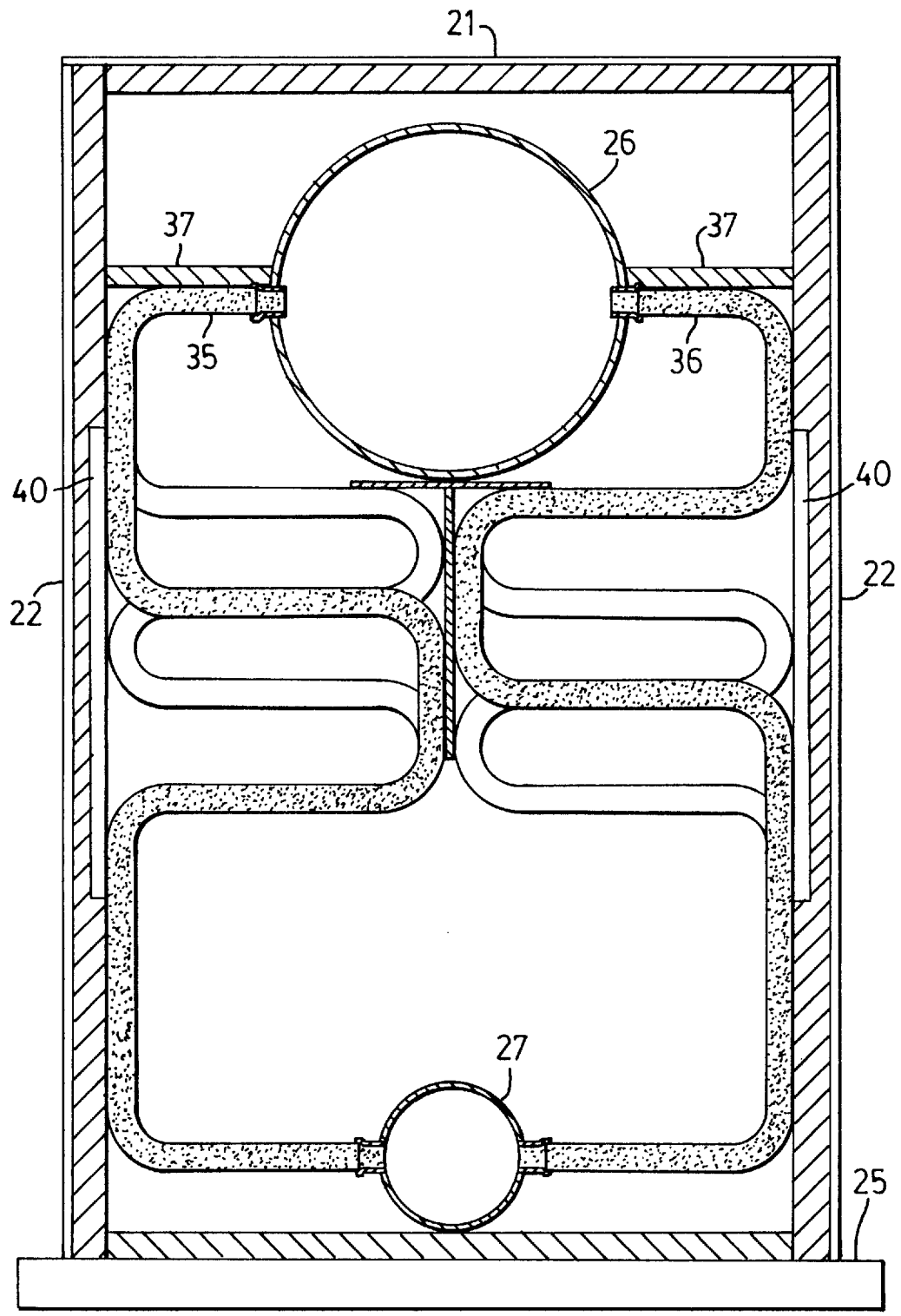
FIG. 10 is a rear view of FIG. 7 showing the differently bent tubes that form the access opening to permit the gases to flow from one gas passage to the next with the insulating board which redirects the gases.

FIG. 10 is a rear view of FIG. 7 showing the housing 20 with a top wall 21, side walls 22, base 25. It shows the serpentine tubes that are bent differently to form the access openings that allow the gases to flow from one gas passage to the next, 35 and 36, serpentine tubes 31 and gas passage isolator 42 upper manifold 26, lower manifold 27, removable gas passage closing plate 40 and the insulating board 37 that redirects the gases.

The novel boiler offers advantages with regard to nitrogen oxides (NOX) discharges as well. The NOX generation can be held to a minimum if combustion is under steady load and ideal conditions are established.

However, when the load fluctuates, there is a serious problem. In accordance with the present invention, the radiation section, i.e. the burner, is controlled independently of the convection section, i.e. the heat exchanger. Specifically, if less steam is required, so less fuel is burned; it is merely necessary to synchronize a motorized damper at the front of the gas passage immediately above the lowermost passage.

With the burner firing rate controlled so that, as the firing rate reduces, the damper will close and, as the firing rate increases, the damper will open, thereby maintaining the furnace chamber at a constant pressure.

The tubes, drums and manifolds may be formed of conventional boiler materials such as iron, steel, etc., and the boiler surfaces may be lined with refractory material, as desired.

The boiler shown in the drawings has four chambers above the combustion chamber; but, by appropriate bending of the tubes, the number could be one to ten, or more.

The number of tubes can also be varied; but, one suitable installation has the following parameters:

(1) Upper manifold - 20" dia×162"
(2) Lower manifold - 12" dia×152"
(3) Tube diameters - 1 ½" inches
(4) Number of tubes per side - 61
(5) Total number of passages - 5

Certain advantages of the system have already been noted but there are many more. Specifically, the novel construction has the following advantages:

(a) the ability to independently control the combustion chamber pressures at all firing rates makes the burning of any fuel more efficient and easier;

(b) the boiler can be efficiently fired with gas, oil or coal by pulverized burner, wood or any solid combustible fuel or even municipal waste;

(c) the boiler gas passages are easily cleaned either manually or automatically;

(d) the boiler is suitable for exhaust gas utilization;

(e) the boiler meets the requirements of the ASME steam boiler construction code, Section 1, for low and high pressure steam, low and high temperature hot water, hot mineral oils and black liquor. The entrance of tubes into the manifolds allows large ligaments between the tube holes. This results in the boiler drums being as little as only 30 per cent of the thickness that is required in traditional boilers. This also allows the tubes to be attached to the drums by a drive morse taper rather than expanding the tube ends into the manifolds, which reduces labour costs in production and/or field assembly;

(f) the boiler does not require external draft controls of any kind;

(g) the boiler pressure vessel forms a perfect rectangular cube with water cooled sides and thus eliminates the need for expensive refractories and insulation; and (h) the boiler tubes provide free expansion and contraction in all areas.

It will be appreciated that the instant disclosure and examples are set forth by way of illustration only and that various modification and changes may be made without departing from the spirit and scope of the present invention.

I claim:

1. A boiler comprising: a housing having a top provided with a gas outlet, a bottom, opposite side walls and front and rear walls; said housing containing an upper manifold and a lower manifold substantially parallel to the top, bottom and side walls; first and second sets of tubes each comprising a plurality of tubes, one set joining the upper manifold to the lower manifold on one side, and the other set joining the upper manifold to the lower manifold on the other side, the tubes of the first set rising from the lower manifold upwardly along their side wall, crossing the housing to the centre recrossing the housing rising therealong and eventually joining the upper manifold, the tubes of the second set rising from the lower manifold upwardly along their sidewall crossing the housing to be substantially in contact with the tubes of the first set so as to form a plurality of superimposed passages, certain adjacent passages being separate one from the other by a passage isolator; individual tubes being bent differently so as to form access openings upwardly at the back and laterally at the front from passage to passage; the openings being offset so as to require the hot gases flowing through said passages to traverse one passage from front to back and the next passage from back to front, means of introducing liquid into lower manifold and for withdrawing liquid or vapour from the upper manifold and means for introducing hot gases into the lowermost of the superimposed passages which they successively and alternately transverse laterally from back to front until they exit through the gas outlet at the top; the liquid flowing through the manifolds and tubes being heated by the hot gases.

2. A boiler according to claim 1, wherein the tubes of each set are in substantial contact with one another so as to substantially prevent passage of hot gases therebetween.

3. A boiler according to claim 1, including a plate at each side of the housing to laterally close off the superposed passages.

4. A boiler according to claim 1, including an insulating board atop the tubes with an opening at one end remote from the gas outlet so that the gases leaving the uppermost passage defined by the tubes traverse the housing to arrive at the gas outlet.

5. A boiler according to claim 1, wherein the gas outlet and the means for introducing hot gases into the lowermost of the superposed passages are at opposite ends of the housing.

6. A boiler according to claim 1, wherein the gas outlet and the means for introducing hot gases into the lowermost of the superposed passages are at the same end of the housing.

7. A boiler according to claim 1, wherein there is an odd number of superposed passages.

8. A boiler according to claim 1, wherein there is an even number of superposed passages.

* * * * *